(12) United States Patent
Herlitzius et al.

(10) Patent No.: US 12,352,615 B2
(45) Date of Patent: Jul. 8, 2025

(54) WEIGHING DEVICE WITH SPECTRAL ANALYSIS

(71) Applicant: V-ZUG AG, Zug (CH)

(72) Inventors: Clemens Herlitzius, Schindellegi (CH); Brian Edwin Pink, Baar (CH); Hilmar Meienberg, Baar (CH)

(73) Assignee: V-ZUG AG, Zug (CH)

( * ) Notice: Subject to any disclaimer, the term of this patent is extended or adjusted under 35 U.S.C. 154(b) by 570 days.

(21) Appl. No.: 17/767,124

(22) PCT Filed: Oct. 7, 2020

(86) PCT No.: PCT/EP2020/078143
§ 371 (c)(1),
(2) Date: Apr. 7, 2022

(87) PCT Pub. No.: WO2021/073982
PCT Pub. Date: Apr. 22, 2021

(65) Prior Publication Data
US 2022/0373386 A1     Nov. 24, 2022

(30) Foreign Application Priority Data

Oct. 14, 2019 (CH) ..................................... 01311/19

(51) Int. Cl.
*G01G 19/56* (2006.01)
*A47J 36/32* (2006.01)
(Continued)

(52) U.S. Cl.
CPC .............. *G01G 19/56* (2013.01); *A47J 36/32* (2013.01); *G01G 3/165* (2013.01); *A47J 2043/0733* (2013.01)

(58) Field of Classification Search
CPC .......... G01G 3/165; G01G 19/56; A47J 36/32; A47J 2043/0733
See application file for complete search history.

(56) References Cited

U.S. PATENT DOCUMENTS 4,476,946 A * 10/1984 Smith .................... G01G 19/52
177/144
5,958,272 A * 9/1999 Taplan ................... F24C 7/083
219/465.1
(Continued)

FOREIGN PATENT DOCUMENTS

CN          87105638 A     6/1988
CN         104330136 A     2/2015
(Continued)

OTHER PUBLICATIONS

English translation of Chinese Office Action, corresponding to Chinese Patent App. No. 202080071832.6, dated Nov. 27, 2024.
(Continued)

*Primary Examiner* — Natalie Huls
(74) *Attorney, Agent, or Firm* — McCormick, Paulding & Huber PLLC

(57) ABSTRACT

The invention relates to a weighing device, e.g. for kitchens. It has a support plate (1) for receiving the object to be measured and a controller (16). Furthermore, an excitation element (12) for generating mechanical vibrations in the support plate (1) and a measuring element (14) for measuring the mechanical vibrations of the support plate (1) are provided. The excitation element (12) and the measuring element (14) are used to determine one or more resonance frequencies and/or other spectral characteristics of the support plate (1), and this is used, for example, to determine the mass of the object.

26 Claims, 7 Drawing Sheets

(51) Int. Cl.
*A47J 43/07* (2006.01)
*G01G 3/16* (2006.01)

(56) References Cited

U.S. PATENT DOCUMENTS

| | | |
|---|---|---|
| 7,138,800 B1 | 11/2006 | Maier et al. |
| 8,571,829 B2 * | 10/2013 | Atlas .................. G01H 13/00 702/56 |
| 2002/0106230 A1 * | 8/2002 | Luque .................. G01G 3/16 400/703 |
| 2004/0145107 A1 * | 7/2004 | Luque .................. B65H 3/0607 271/10.02 |
| 2005/0269215 A1 * | 12/2005 | Horkay .................. G01N 5/025 205/792 |
| 2006/0015268 A1 | 1/2006 | Paik et al. |
| 2010/0161254 A1 | 6/2010 | Atlas et al. |
| 2013/0333957 A1 * | 12/2013 | Feldotte ............... G01G 21/286 177/262 |
| 2015/0034396 A1 | 2/2015 | Tchertkov et al. |
| 2017/0176240 A1 * | 6/2017 | Paul .................. G01G 19/44 |
| 2018/0202857 A1 * | 7/2018 | Tal .................. G01G 19/08 |
| 2018/0279912 A1 * | 10/2018 | Penta .................. A61B 5/107 |

FOREIGN PATENT DOCUMENTS

| | | | |
|---|---|---|---|
| CN | 104849147 A | 8/2015 | |
| CN | 105393095 A * | 3/2016 | .......... G01G 23/166 |
| CN | 108917895 A | 11/2018 | |
| DE | 102014111193 A1 | 2/2016 | |
| EP | 2574886 A2 | 4/2013 | |
| EP | 3273165 A1 | 1/2018 | |
| JP | H03-54432 A | 3/1991 | |
| KR | 20060006269 A * | 1/2006 | |
| WO | 0226002 A2 | 3/2002 | |

OTHER PUBLICATIONS

Wang, Junli & Feng, Bolin, Research on the dynamic characteristics of a load cell creep error detection device, Journal of Xi'an University of Technology No. 3, dated Sep. 30, 2017, see English abstract included within.

* cited by examiner

WEIGHING DEVICE WITH SPECTRAL ANALYSIS

CROSS-REFERENCE TO RELATED APPLICATION

This application is a National Stage application of International Patent Application No. PCT/EP2020/078143, filed on Oct. 7, 2020, which claims priority to Swiss Application No. 01311/19, filed Oct. 14, 2019, each of which is hereby incorporated by reference in its entirety.

TECHNICAL FIELD

The invention relates to a weighing device, in particular for kitchens, as well as to a cooktop or a piece of furniture, in particular a piece of kitchen furniture, comprising such a weighing device according to the main claims. The invention also relates to a method for operating such a weighing device as well as to an apparatus unit for such a weighing device or for carrying out the present method.

BACKGROUND

Scales of various designs have been known that measure the elastic deformation of the mount of a support plate, e.g. by means of strain gauges or by means of capacitive or optical sensors.

WO 02/26002 describes a cooktop with a built-in scale where the weight of the object to be measured is determined by detecting the static deformation of the support plate of the cooktop. For this purpose, suitable detectors are required in the center below the support plate. These must be able to measure deformations precisely, which is difficult because absolute positions must be determined without a suitable reference position.

SUMMARY

It is an object to provide a weighing device, and in particular a cooktop, a piece of furniture, in particular a piece of kitchen furniture, or a method of the type mentioned above that allow simple but accurate weighing.

This object is achieved by the weighing device, the cooktop, the furniture, and the method according to the independent main claims.

Accordingly, the weighing device, which is particularly suitable for kitchens, has the following elements:

A support plate: This is used to support the object whose mass is to be measured.
A controller: The controller controls the weighing process.
At least one excitation element: This is arranged and designed so that it can generate mechanical vibrations in the support plate.
At least one measuring element: This is located and adapted to measure the mechanical vibrations.

Further, the weighing device (preferably its controller) is adapted to do the following:

determining at least one spectral characteristic of the vibrations of the support plate (with the object placed on it) by means of the excitation element and the measurement member, and
using the spectral characteristic to determine the mass of the object.

The invention is based on the understanding that (as explained in more detail below) the spectral characteristics of the vibrations of the support plate, with the object to be measured placed thereon, depend on the mass of the object. Such spectral characteristics can be accurately determined in a simple manner and used for mass measurement.

In particular, the spectral characteristic comprises at least one resonant frequency of the support plate. For example, the spectral characteristic is such a resonant frequency, or it depends directly or indirectly on such a resonant frequency.

To determine the mass from the spectral characteristic of the support plate, there are different possibilities, depending on the circumstances, which are described in more detail below.

In particular, the controller is adapted to determining at least two different spectral characteristics of the oscillations and using the at least two spectral characteristics to determine the mass of the object.

In this way, a higher accuracy can be achieved and/or, in addition to the mass, another unknown parameter can be determined or eliminated, such as the diameter of the object (e.g. in the case of a pot) or a position parameter of the object on the support plate.

The controller is advantageously adapted to determining the resonance frequencies of at least two eigenmodes of the support plate and using the resonant frequencies of the at least two eigenmodes to determine the mass of the object.

For rectangular or square support plates, the excitation element and/or the measuring element is advantageously arranged within a tolerance T on at least one of the diagonals of the support plate, with the tolerance T being at most 10% of the shortest side length of the support plate. Furthermore, the distance D1 of the excitation element from the center of the diagonal and/or the distance D2 of the measuring element from the center of the diagonal lies or lie in a range between 5% and 45%, in particular between 25% and 45%, of the length L of the diagonal.

If both the excitation element and the measuring element lie, in the sense of this definition, on at least one of the diagonals, then both members can lie on the same diagonal or on different diagonals.

In a preferred embodiment, the excitation element and the measuring element are located on different diagonals, with a control panel arranged between the excitation element and the measuring element beneath the support plate, since in this case there are usually no heating elements arranged at the location of the members.

This is based on the understanding that at least most of the low modes on the diagonal do not have a vibration node in the mentioned range, i.e. good measurements can be performed if the excitation element and/or the measuring element are placed in this range.

If several excitation elements and/or measuring elements are provided, preferably at least one of them should have the mentioned arrangement relative to the diagonal and its center.

The invention also relates to a cooktop having a weighing device of this type. The cooktop has a plurality of heating elements arranged beneath the support plate, such that the support plate forms the cooking surface of the cooktop.

Further, the invention also relates to a piece of furniture, in particular a piece of kitchen furniture, having a weighing device of this type. The support plate is preferably arranged on the upper side of the kitchen furniture, so that it forms a working surface of the kitchen furniture.

Finally, the invention also relates to a method of operating a weighing device of this type. This method comprises at least the following steps:

Generating mechanical vibrations in the support plate by means of the excitation element, Measuring at least one spectral characteristic of the vibrations by means of the measuring element and Using the at least one spectral characteristic of the vibrations to determine the mass of the object on the support plate.

Advantageously, the excitation element can also be used to communicate with the user, for example by using the excitation element to generate a haptic or acoustic signal for the user.

The invention also relates to a measuring device for the cooktop, furniture, or method according to the present disclosure that is suitable for arrangement on the support plate. It comprises at least the following elements:

at least one excitation element for generating mechanical vibrations in the support plate and at least one measuring element for measuring the mechanical vibrations.

The measuring device is adapted to:

determining at least one spectral characteristic of the vibrations by means of the excitation element and the measurement element, and using the spectral characteristic to determine a mass of the object.

The measuring device may further have the features mentioned in the dependent claims. For example, it may be configured as a smartphone, tablet, computer, etc.

The invention can be used, for example, to weigh a cooking vessel or its contents on the support plate. It can also be used to control a cooking process and/or to generate instructions for the user based on the weight measurement (or change in weight).

BRIEF DESCRIPTION OF THE DRAWINGS

Further embodiments, advantages and applications of the invention are given in the dependent claims and the now following description referring to the figures. These show:

DETAILED DESCRIPTION

Definitions

The "diameter" of the object to be measured is understood to be the diameter of the contact surface of the object with the support surface, under the (idealized) assumption that the surface of the support plate and the bottom side of the object are completely flat. Alternatively, the term is understood to mean the "real" diameter seen by the scale.

The specification that the support plate is "made of glass ceramic" is to be understood as meaning that the glass ceramic without any inscriptions, coatings and/or other surface elements, is at least 90% of glass ceramic.

A "spectral characteristic" of an oscillation describes at least one property of the motion of the support plate when it is excited. This can be e.g. an amplitude or a phase at a certain frequency, the frequency of a certain spectral characteristic (e.g. a peak of the spectrum), the time delay between excitation and response or between the motions at different positions of the support plate, a rise or decay behavior at short excitations, etc.

Basic Structure

Figure 1:
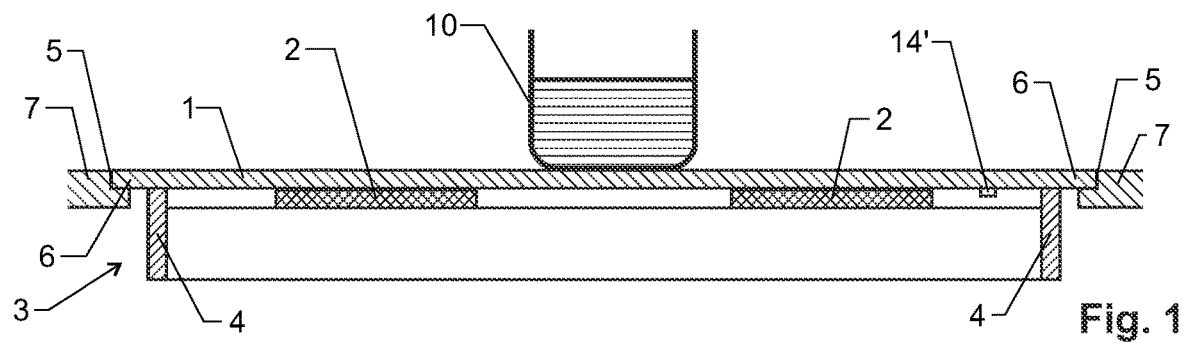
FIG. 1 a sectional view of a first embodiment of a cooktop along line I-I of FIG. 2, FIG. 2 the cooktop of FIG. 1 from above, FIG. 3 a block diagram of some components of the weighing device.
Figure 2:
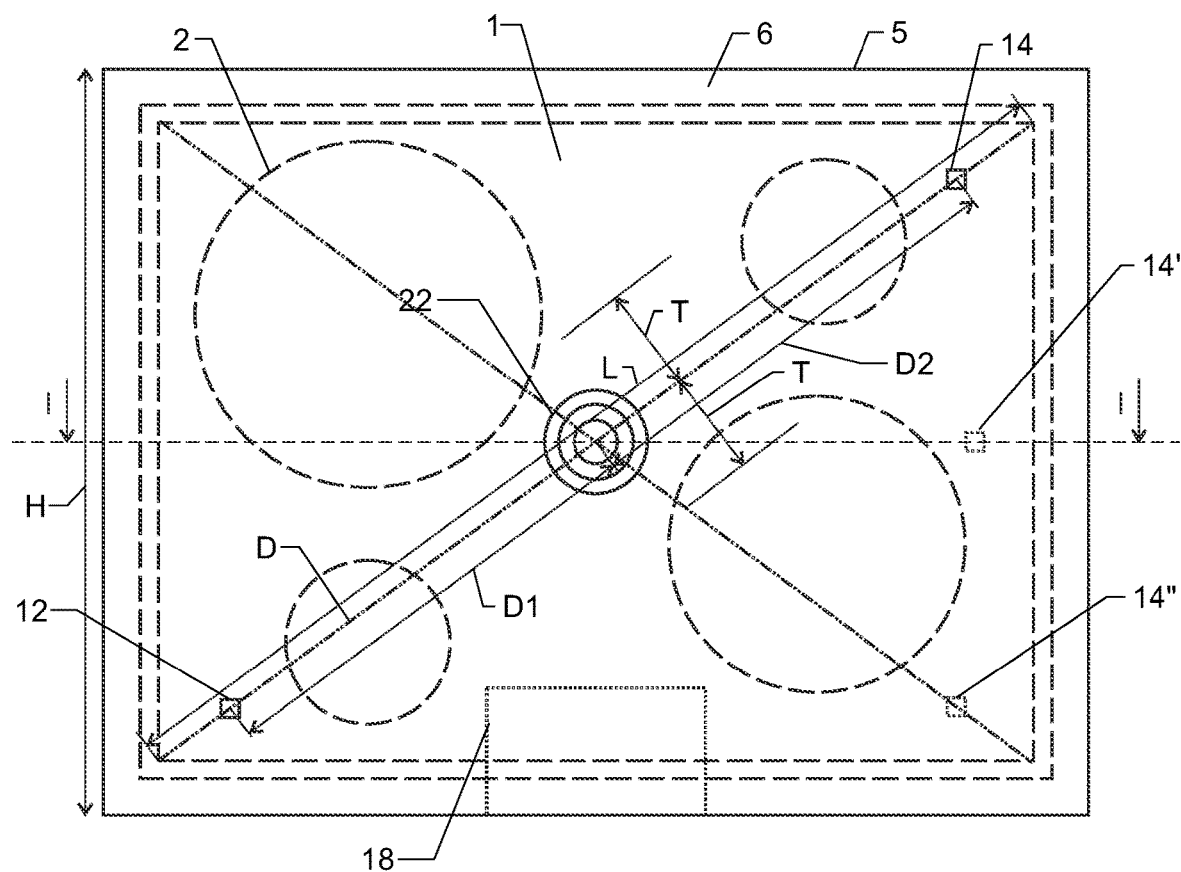
Figure 3:
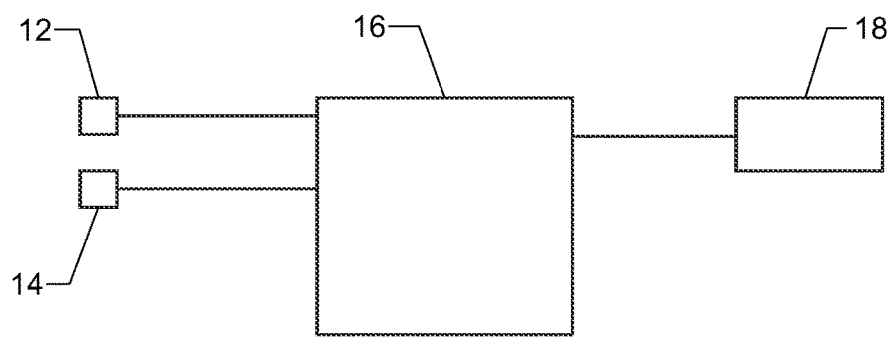

FIGS. 1-3 show a cooktop with a support plate 1, e.g. made of glass ceramic, and with e.g. four heating elements 2 beneath the support plate 1.

An appliance assembly 3 is arranged on a bottom side of the support plate 1, which accommodates the electrical and other mechanical components of the cooktop. It has a device frame 4, which is attached to the bottom side of the support plate 1.

In the embodiment shown, the device frame 4 has the same shape as the outline of the support plate 1, but it is spaced on all sides from an outer edge 5 of the support plate 1 such that the support plate 1 forms a projection 6 extending horizontally over the device frame 4. However, the device frame 4 can also deviate in its shape from the support plate 1.

The projection 6 can be used to mount the support plate in the opening of a panel 7 of a kitchen cabinet.

Advantageously, the device frame 4 is connected to the support plate at several points on each longitudinal side, in particular along the entire respective length, e.g. by means of gluing. In this way, the device frame 4 forms a defined oscillation frame for the oscillation movements in the central area of the support plate, which makes the mechanical resonances of the support plate 1 less dependent on the details of the mounting of the device on the outer edge 5. This is advantageous for the measurement procedure described below.

Further, the device frame 4 preferably has a diameter of at least 80%, but at most 98% of the support plate 1, so that, for all diagonal directions radially within the device frame, a large area remains in which the support plate 1 can swing essentially freely. But at the same time a sufficient projection 6 is available for mounting.

Within the device frame 4, the support plate 1 should advantageously be able to oscillate freely in that, for example, no stiff, heavy components are attached to the support plate 1 there, with the possible exception of the excitation element.

Measurement Technique

The present measurement technique is based, regardless of the exact design of the weighing device (e.g., whether it is part of a cooktop or another arrangement), on the idea of measuring at least one mechanical resonant frequency of the support plate 1. This can be used to determine the mass of a load 10 placed on the support plate. This will be described in more detail below.

The support plate 1 has various resonant modes of vibrations for deflections perpendicular to the support plate 1 (hereinafter referred to as "eigenmodes" or "modes"). If, for example, it is assumed that there is no motion in the area of the device frame 4 in the eigenmode with the lowest resonant frequency, the center of the plate moves the most in this mode, i.e. a wave maximum is formed in the center of the support plate 1 and a node along the device frame 4. In the mode with the second lowest frequency, in the case of a rectangular plate, two vibration bellies of opposite deflection are located at a distance from each other on the longitudinal center axis of the support plate 1, etc.

The oscillatory motions (i.e., the deflections) of the support plate 1 at the lowest modes essentially occur in the vertical direction.

If a load 10 is now placed on the support plate 1, the resonant frequencies will generally decrease, and the modes may also change in shape and amplitude distribution. The change depends, on the one hand, on the mass of the load 10, but on the other hand also on its shape (i.e. the shape and in particular the diameter of the contact surface between the load 10 and the support plate 1) and its position.

By measuring at least one or, if necessary, several resonance frequencies, the mass and any other parameters of the load can be measured.

In order to perform corresponding measurements, the weighing device has at least one excitation element 12 and at least one measuring element 14, as shown in FIG. 2.

The excitation element 12 causes the support plate 4 to vibrate mechanically, in particular perpendicular to the surface of the support plate 4. These vibrations can be measured with the measuring element 14.

Excitation element 12 may, for example, be an electromechanical hammer that applies a short shock to the plate. This excites vibrations over a wide frequency range. The strongest vibration amplitudes are generated at the resonant frequencies. They can be measured by means of spectral analysis of the signal from the measuring element 14, e.g. using Fourier analysis.

The measuring element 14 can be a microphone, for example, or it can be a capacitive or optical measuring element that determines the time-dependent deflection of the support plate at a given point. In particular, it may be an acceleration sensor.

In another embodiment, the excitation element 12 may be configured, for example, as a mass excitable to vibrate at a desired frequency, or as a loudspeaker, by means of which a periodic force can be applied to the support plate 4 at one point.

In this case, the frequency of the excitation element 12 may be tuned through a plurality of frequencies, for example, and for each frequency the signal from the measurement member 14 is then analyzed to determine those frequencies with the strongest amplitude of vibration.

In a further embodiment, the excitation element can be used to generate several frequency components simultaneously, in a superimposed signal. This can be, for example, a superposition of several periodic signals. Or, for example, a noise, in particular a white or pink noise, can be generated. In these cases, the signal of the measuring element can be evaluated, for example, by means of spectral analysis, in particular by means of Fourier transformation.

In a further embodiment, the excitation element 12 and the measurement member 14 may be formed by the same component, such as by an electric coil arranged at a permanent magnet, either the coil or the permanent magnet being connected to the support plate. A short current pulse through the coil applies a force pulse to the support plate 1, and then the current flow through the coil is measured to analyze the movement of the plate after the force pulse. Alternatively, the excitation element 12 may be operated with a known voltage (or current), for example, and then the current (or voltage) is measured to derive a signal for the oscillation.

Advantageously, the excitation element 12 and the measuring element 14 are located on points where the resonances of the support plate 1 with the lowest frequency show strong movements, i.e. they are far away from the respective vibration nodes. They are therefore, preferably, located on at least one of the diagonals D of the support plate, either exactly or at least within a certain tolerance T. In other words, the distance between the diagonal and the measuring element 14 should be smaller than the tolerance T. This tolerance T is a fraction of the shorter side length H of the support plate 1, preferably at most 10% of H.

In this context, the diagonal D is to be understood as the connecting line between two opposite corner points of the support plate 1 or, if the support plate 1 is connected to a rigid device frame 4 that generates a vibration node, the length D is the connecting line between two opposite corner points of the device frame 4.

For the same reason, the distance D1 of the excitation element 12 from the center of the diagonal D is preferably in a range between 5% and 45%, in particular between 25% and 45%, of the length L of the diagonal D. Likewise, the distance D2 of the measuring element 14 from the center of the diagonal D is preferably in a range between 5% and 45%, in particular between 25% and 45%, of the length L of the diagonal D.

In a particularly preferred embodiment, the excitation element 12 and the measuring element 14 are located on different diagonals, as indicated in FIG. 2 for the measuring element 14''. The position is advantageously selected so that a control panel 18 of the cooktop is arranged between the two members 12, 14'' because, in cooktops, the heating elements 2 are often set back somewhat on the side of the control panel 18. This makes it easier to arrange the members 12, 14'' in cool areas.

FIG. 3 shows a block diagram of some of the components of the weighing device as used in connection with the weighing process. In particular, a controller 16 is provided, which is connected to the excitation element 12 and the measuring element 14 via suitable interface circuits. Moreover, the control panel 18 is provided, for example a touch-sensitive screen, to display the mass and/or other parameters, if any, and/or to receive commands from the user.

Figure 4:
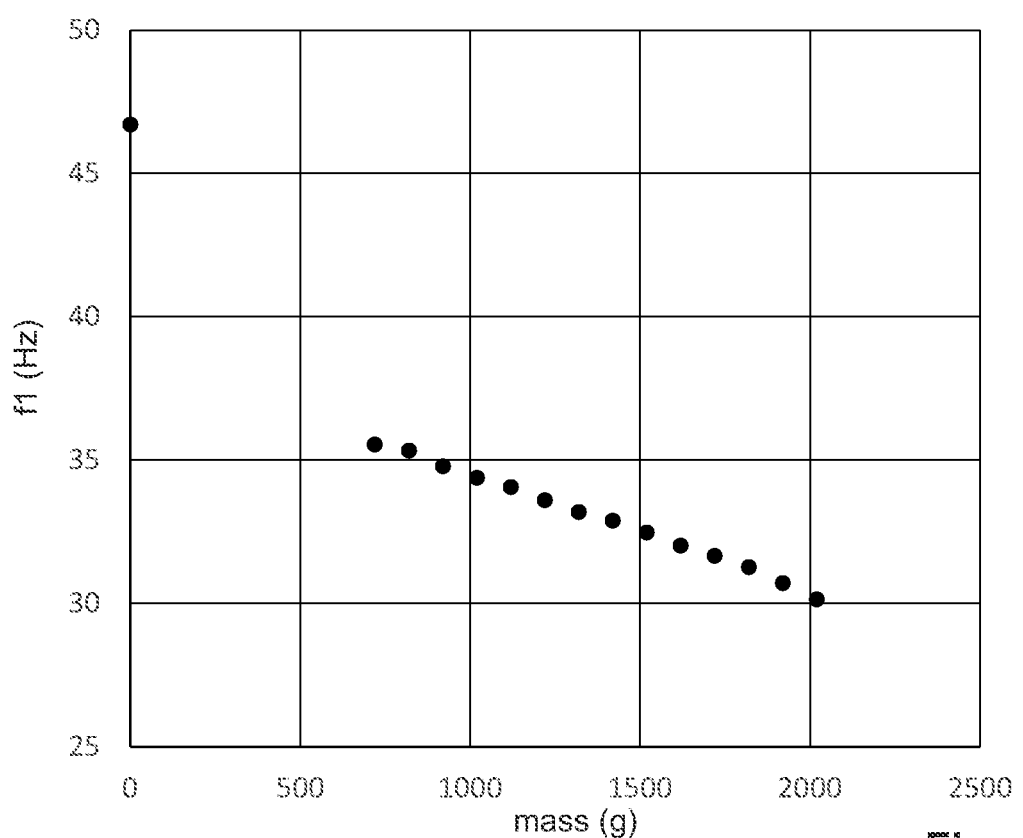
FIG. 4 shows an example of values of the lowest resonant frequency f1 as a function of the mass of a load, FIG. 5 the lowest resonant frequency as a function of the mass and radius of a load, FIG. 6 the second resonant frequency as a function of the mass and diameter of a load, FIG. 7 possible values of mass and radius at given first and second resonant frequencies, FIG. 8 a sectional view of a second embodiment of a cooktop along line I-I of FIG. 2, FIG. 9 a sectional view of a kitchen furniture with a weighing device, FIG. 10 an illustration for determining optimum positions for the excitation and measurement element from a mode analysis of the support plate, FIG. 11 an embodiment of the controller with neural network.

FIG. 4 shows the resonant frequency f1 of the lowest frequency mode of a rectangular support plate 1 made of glass ceramic with a width of 910 mm, a length of 514 mm and a thickness of 4 mm for loads with different masses. A vessel with diameter 148 mm was placed on the center of the support plate 1 and increasingly filled with water to increase its mass.

As can be seen, the resonant frequency f1 decreases with increasing load.

Thus, it is easily possible to determine the mass from the frequency.

However, the determination of the mass from the lowest frequency resonance alone requires that the real diameter as well as the position of the load are known.

For example, assuming that the diameter of the load also varies, but that the load is placed in the center of the support plate 1 for each measurement, the lowest frequency resonance f1 depends on diameter and mass. This is illustrated in FIG. 5, where "pot radius" denotes the radius of the load, "mass" its mass, and "mode 1" the frequency f1.

Within the graph, curves for mass vs. frequency are shown for different radii. In the plane "mass" vs. "pot radius", the curve of possible pairs of values is drawn as an example for a measured frequency f1=45.092 Hz.

FIG. 2 shows the same plot, but the second lowest resonant frequency f2 is plotted on the vertical axis, and the curve in the "mass" vs. "pot radius" plane shows the possible pairs of values as an example of a measured frequency f2=109.878 Hz.

Figure 5:
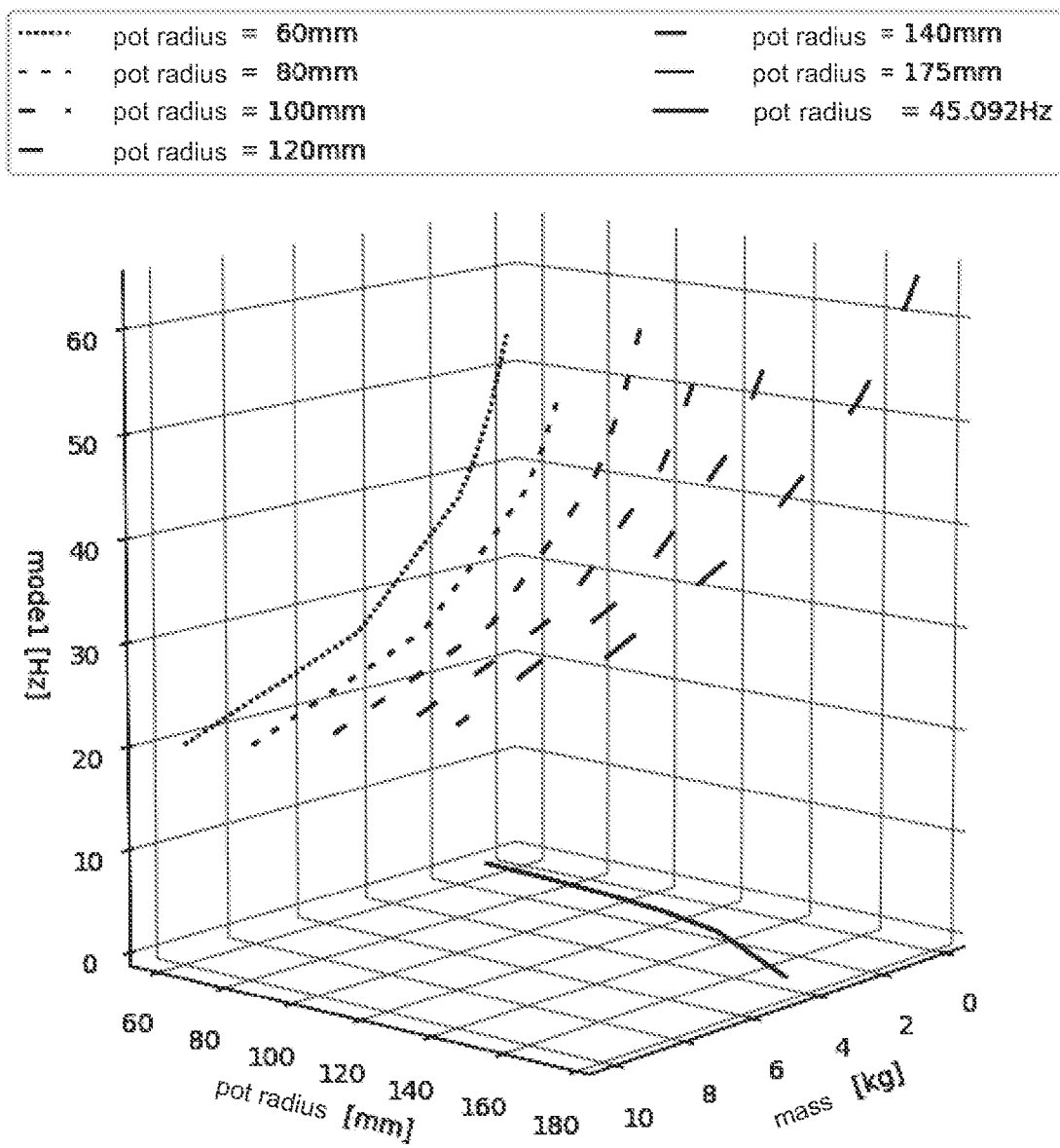
Figure 6:
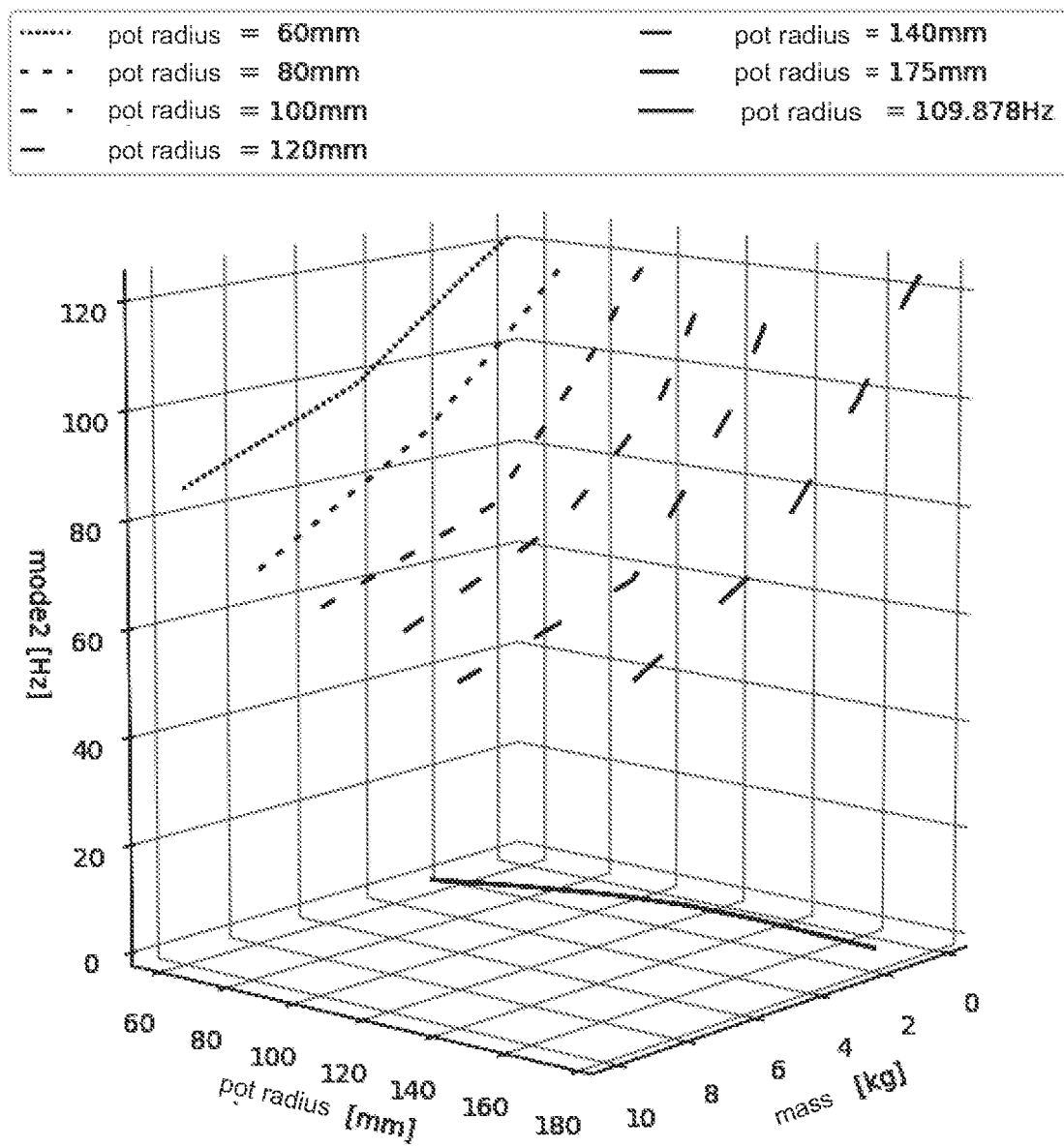
Figure 7:
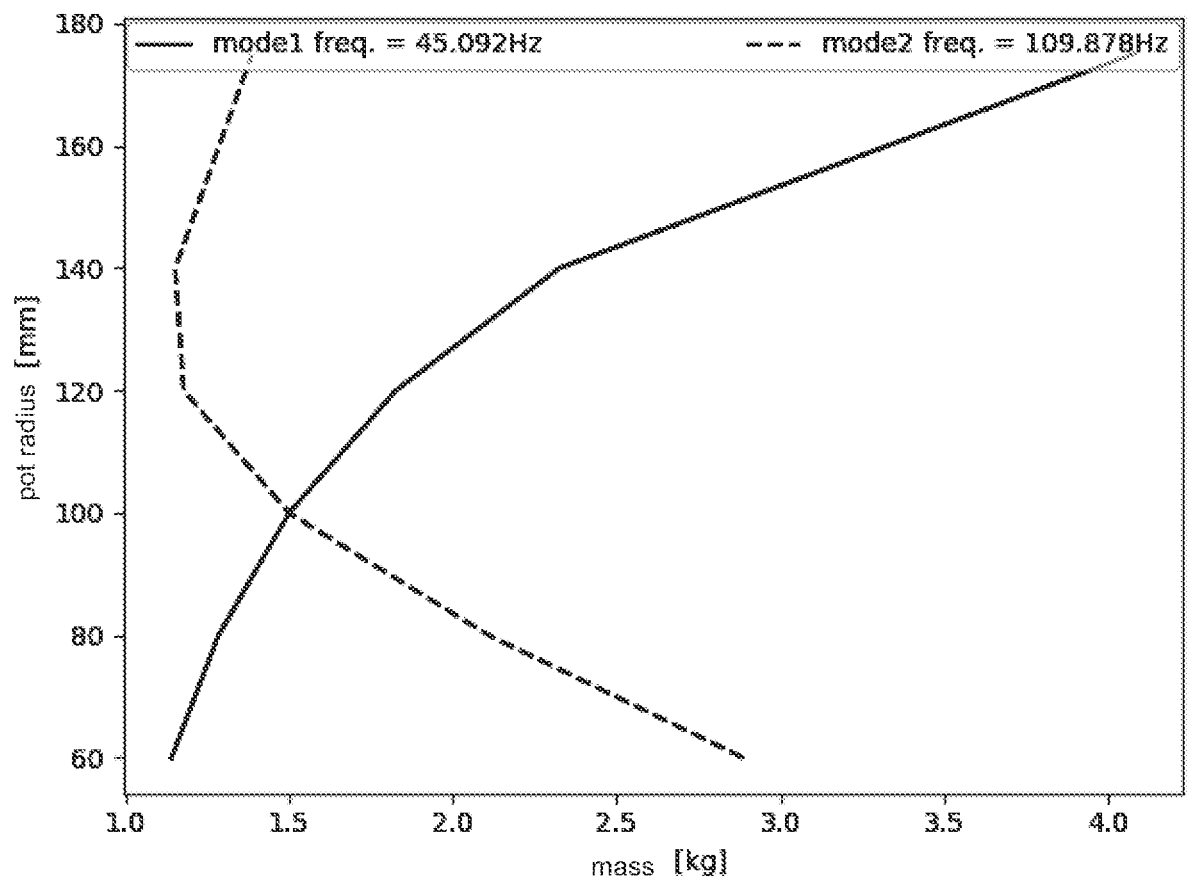

When the two curves in the "mass" vs. "cup radius" plane of FIGS. 5 and 6 are now considered together, the plot shown in FIG. 7 results. It shows that, in the present device setup, at f1=45.092 Hz and f2=109.878 Hz, the mass is about 1.5 kg and the radius about 100 mm.

This illustrates that, by means of the measurement of at least two resonant frequencies f1, f2, in addition to the mass, a second parameter can be determined or compensated, here e.g. the diameter of the load.

To a good approximation, the resonant frequency of a given eigenmode depends on the parameters mass m, diameter d, and position, expressed e.g. in x and y coordinates. So, in other words, for the frequencies of modes 1, 2, 3 etc.:

$$f1 = F1(m,d,x,y)$$

$$f2 = F2(m,d,x,y)$$

$$f3 = F3(m,d,x,y) \quad \cdots \quad (1)$$

The functions F1, F2, etc. can be determined e.g. from calibration measurements and/or from theoretical calculations. For the theoretical calculations, for example, a modal analysis can be carried out within the framework of a finite element simulation.

Eqs. (1) represent a system of N independent equations whose left side can be measured in each case and whose functions F1, F2 . . . FN. are known in each case. The mass m is usually unknown. If the other parameters d, x and y are known, the measurement of one mode (N=1) is sufficient for the determination, preferably that of f1.

However, it is also possible to measure more than one mode, in which case we have an overdetermined system of equations, from which a more accurate result can be determined, e.g. by means of equalization calculus.

If the diameter d is also unknown, the frequencies of N=2 or more modes must be measured.

If, for example, in addition to the diameter d, the position coordinates x and y are also unknown, it is advantageous to measure at least N=4 modes.

Preferably, the resonant frequencies of at least N=2, in particular of at least N=3, eigenmodes are determined and used to determine the mass m.

Advantageously, the measured resonant frequencies are the lowest resonant frequencies of the support plate. These are the ones that can be distinguished most easily from each other, and they also correspond to large "wavelengths", so they may be less sensitive to position and diameter.

Note that in addition to or as an alternative to resonant frequencies, other characteristics of the vibrations of the support plate 1 can be used for weight measurement, see section "Other spectral characteristics and/or evaluations", below.

Calibration

Apart from the mentioned parameters of the load, the resonance frequencies also depend, for example, on how the support plate is mounted.

For example, the frequencies are dependent on the mounting of the support plate 1 in the respective kitchen furniture, especially if the device frame 4 is not able to completely decouple the vibrations in the projection 6 from those in the inner area of the support plate 1.

Therefore, the device is preferably calibrated after its installation.

In a particularly simple embodiment, the controller 16 of the device can, for example, be adapted to perform the calibration measurement under a known load m, in particular under a load-free state (m=0).

For example, the length L of the freely oscillating diagonal D can be determined in this way as a calibration parameter, after which the functions F1, F2, etc. of equation 1 can be determined.

Gross and Tare Measurements

In addition, or alternatively, the controller 16 is adapted to perform the measurement on an empty container ("tare measurement") and on a full container ("gross measurement"). If the mass of the container is m1 and that of its contents (which the user wishes to measure as a net value) is m2, four values f11 and f12 (for f1) and f21 and f22 (for f2) can thus be determined for the first resonant frequency f1 and the second resonant frequency f2:

$$f11 = F1(m1,d,x,y)$$

$$f12 = F1(m1+m2,d,x,y)$$

$$f21 = F2(m1,d,x,y)$$

$$f22 = F2(m1+m2,d,x,y) \quad (2)$$

In this case, the controller 16 preferably assumes that the position x, y and the diameter d of the container do not change between the tare measurement and the gross measurement.

In this way, two measured values can be obtained per mode, so that additional measured values are available, which allows the determination of additional unknown parameters or (e.g. by equalization calculus) of a more accurate measurement of overdetermined parameters.

In this regard, the controller 16 may be adapted to display to the user, after the tare measurement, that the container must be filled to perform the gross measurement, or input means may be provided that allow the user to indicate if a measurement is a tare or gross measurement.

Positioning Aids, Stiffeners

As mentioned, the position coordinates x, y are generally not known. This increases the measurement uncertainty, and/or a larger number of modes must be measured.

Advantageously, the weighing device is therefore equipped with a positioning aid 22 (cf. FIG. 2), which marks a nominal position for the object to be measured. It can, for example, comprise concentric rings, or the like, attached to the support plate 1.

The positioning aid 22 is advantageously arranged at the center of the support plate 1, since the most accurate measurements can usually be performed on a centered object. However, the positioning aid can also be arranged at a position away from the center, e.g. one positioning aid can be provided for each "cooking zone".

Figure 8:
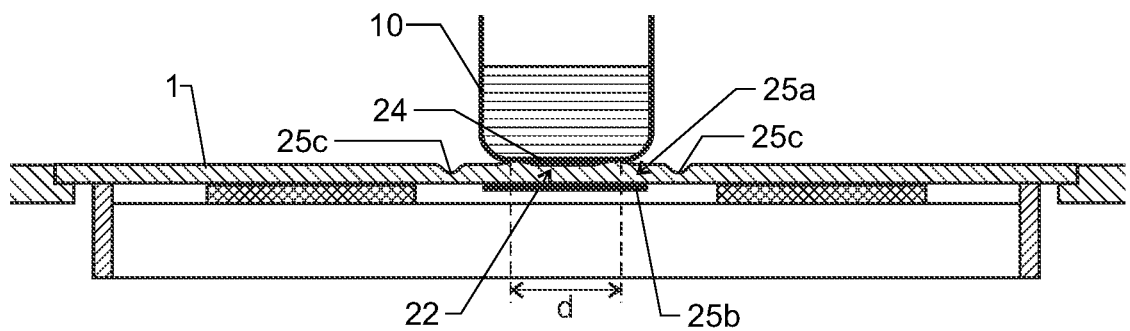

In another embodiment, which is shown in FIG. 8, the positioning aid 22 forms a raised, preferably annular, area 24 in the support plate, i.e. an area which projects upwards above the average height of the upper side of the support plate 1, preferably by at least 1 mm.

This embodiment has the advantage that the raised area 24 can determine the effective contact diameter d independently of the diameter size of the actual load 10 (at least if this is larger than d), as it enters, for example, in equation (1).

In particular, the diameter d of the raised area 24 for a stable support of usual cooking vessels is at least 5 cm but, so that it is smaller than most of the usual cooking vessels, not more than 15 cm, in particular not more than 10 cm.

The raised region 24 may also be configured, for example, as a ring or as multiple, non-contiguous sub-regions.

Alternatively, or in addition to a positioning aid, the support plate 1 can have a stiffened area 25a, with the stiffness of the support plate 1 inside the stiffened area 25a being greater than outside, preferably by at least 50%. This stiffened area forms a nominal support position for the object 10. Thanks to the stiffening, the modes become more independent of the diameter of the object.

For example, the stiffened area can be implemented by a thickening 25b of the support plate 1. The thickening 25b can be formed in one piece with the support plate 1 or applied as an additional component, e.g. by gluing. Advantageously, the thickening 25b is arranged below the support plate 1 so that the upper side of the support plate 1 remains flat.

Preferably, the diameter of the stiffened area is at least cm 10, in particular at least 20 cm, and/or less than 25% of the maximum diameter of the support plate 1.

Preferably, the center of the support plate is located in the stiffened area 25a.

Alternatively, or additionally thereto, the support plate 1 can have a thinned area 25c which extends around the target support area for the object. This can also be used to better decouple the modes from the diameter of the object.

The thickness of the support plate at the location of the thinned area 25c is advantageously less than 75% of the thickness of the support plate 1 radially inside and outside the thinned area 25c.

The inner diameter of the thinned area is again advantageously at least 10 cm, in particular at least 20 cm, and/or the outer diameter of the thinned area is advantageously at most 25% of the maximum diameter of the support plate 1.

Preferably, the thinned area 25c extends around the center of the support plate 1.

Multiple Excitation and/or Actuation Devices

In the measurement, the different modes can be distinguished by their frequency. However, this is not always guaranteed for higher modes since, depending on the load and its position and/or its diameter, the modes can also swap their order of frequencies.

In order to better distinguish individual modes, it can therefore be advantageous to provide several measuring elements at different positions on the support plate 1. For example, FIG. 2 shows a second measuring element 14', which is arranged where certain modes have a node, e.g. on the connecting line between two opposite edge centers. In this way, modes can be better distinguished and assigned to the respective functions Fi in equation (1).

When several measuring elements 14, 14' are used, the controller 16 is preferably adapted to determine the amplitude ratio and/or the phase shift between signals of the measuring elements at the respective resonant frequency.

It is also conceivable that several excitation elements 12 are provided, which, for example, are operated in opposite directions in a first measurement and in the same direction in another second measurement, in order to specifically excite or suppress certain modes.

Arrangement of the Excitation and Measuring Elements

It has already been explained above with reference to FIG. 2 that the excitation element 12 and/or the measuring element 14 are preferably arranged in certain areas, e.g. on one or both diagonals of a rectangular support plate 1 since most modes have no nodes there.

In the following, this concept is somewhat generalized.

Assuming that the weighing device is adapted to determine the resonant frequencies of a given set of modes, the excitation element 12 and/or the measurement member 14 should each be located at a point where the amplitudes of vibration (deflection amplitudes) of all of these modes are at least 25% of the maximum amplitude of vibration of the respective mode.

For example, if the controller 16 measures out modes 0, 1, and 2, and mode 0 (in the center of the support plate) has a maximum amplitude A0max, mode 1 (in the right and left halves of the support plate) has a maximum amplitude A1max, and mode 2 (in the top and bottom halves of the support plate) has a maximum amplitude A2max, the deflection amplitude at the location of the excitation element 12 and/or the measurement member 14 should preferably be at least A0max 0×0.25 for mode 0, A1max 0×0.25 for mode 1 and A2max 0×0.25 for mode 2.

In other words, the excitation element 12 and/or the measurement member 14 should not be too close to any of the nodal lines of the modes as measured by the controller 16.

Figure 10:
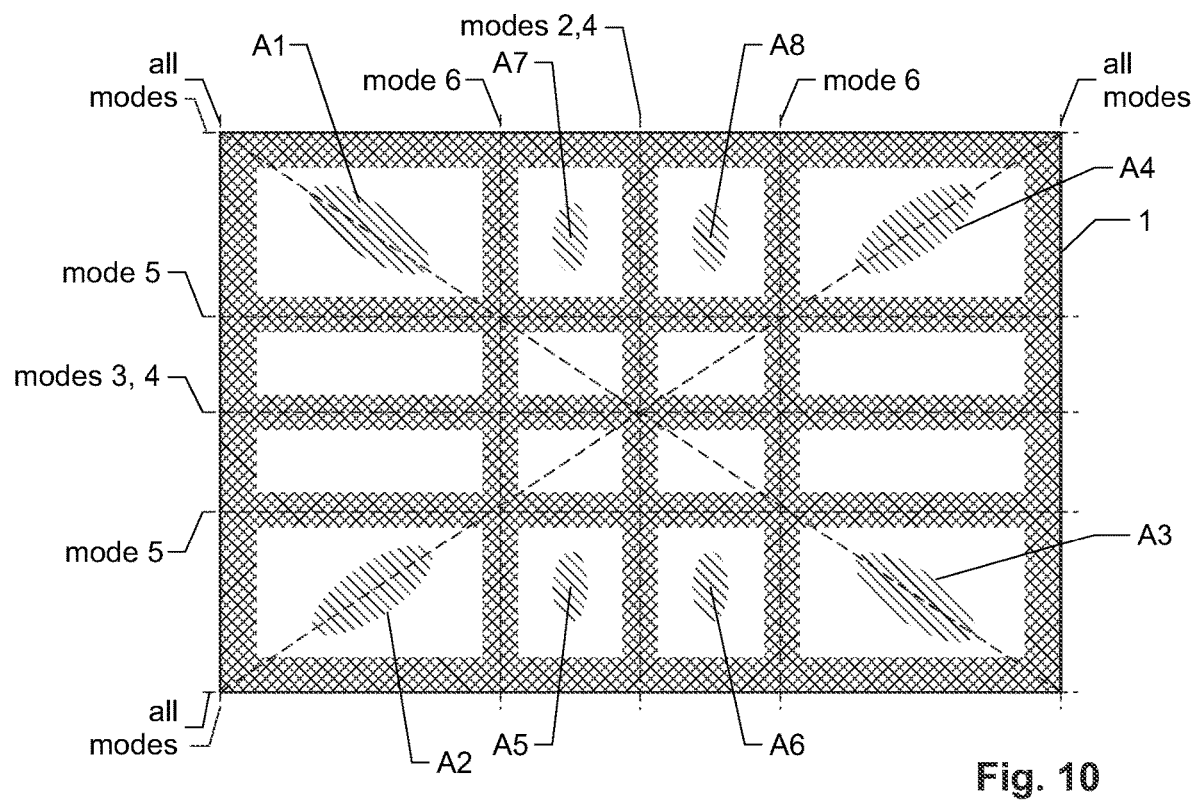

This is illustrated in more detail in FIG. 10. There, the crosshatched areas show the node lines of the individual modes, each with an indication of which modes they apply to. Thus, all modes have a node line at the edge of the support plate 1 or at the device frame 4, depending on the mounting. In addition, modes 2 and 4 have a nodal line along the line between the bisectors of the longer side edges, and modes 3 and 4 have a nodal line between the bisectors of the shorter side edges. In addition, the higher modes 5 and 6, which each form three oscillation maxima along one of the main directions, have node lines along approximately one-third and two-thirds of the length and width of the plate, respectively.

Accordingly, there are regions A1, A2 . . . at which all modes have relatively strong oscillation amplitudes, e.g. the regions A1-A4 on the diagonal (which correspond to the positions indicated for FIG. 2), or e.g. in the regions A5-A8 off the diagonal. The excitation element 12 and/or the measuring element 14 is/are advantageously arranged in one of these areas A1-A8.

These conditions described here is advantageously fulfilled for both the excitation element 12 and the measuring element 14. If there are several excitation elements and/or several measuring elements, it should advantageously be fulfilled at least for one excitation element and/or at least for one measuring element.

Other Spectral Characteristics and/or Processing

In the above examples, the resonant frequency or frequencies of the support plate was/were mentioned as spectral characteristics. However, other spectral characteristics of the vibrations of the support plate when excited can also be used, such as one or more of the following properties:

- The phases of oscillations at certain frequencies. In particular, this includes the relative phase between the excitation and the oscillation at a given frequency. Alternatively, or additionally thereto, it may also include the relative phases between the oscillation at the same frequency at different locations on the support plate 1.
- Amplitudes or amplitude ratios. This can, for example, include an absolute amplitude of vibration at a given frequency or at a resonance, and/or relative vibrations at different frequencies and/or at different locations on the support plate 1.
- The spectral width of at least one resonance (e.g. the FWHM).
- Spectral areas of low amplitude, e.g. one or more minima in the Fourier spectrum of the oscillations.
- Ratios between maxima (peaks) and minima (valleys).
- One or more amplitudes in the spectrum at one or more fixed frequencies.
- Intersection of the Fourier spectrum with a given curve.
- Decay time of an excitation.

In general, any characteristics of the frequency spectrum of the oscillations can be used for evaluation.

Figure 11:
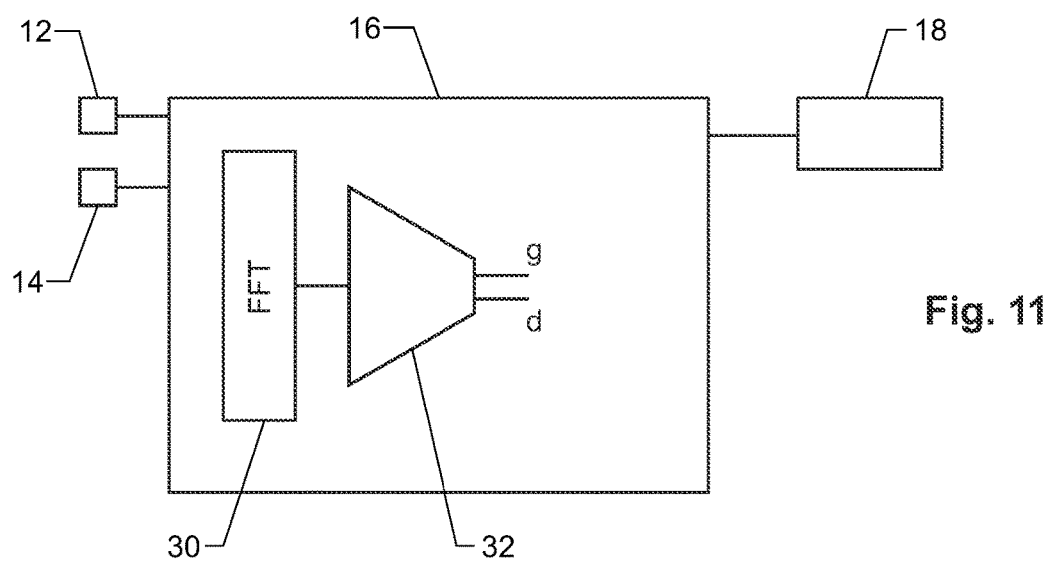

A particularly advantageous embodiment of the controller 16 is shown in FIG. 11. Here, the controller 16 comprises a spectral analyzer 30 that determines several spectral components of the signal(s) from at least one measuring element 14.

The spectrum analyzer 30 can, for example, perform a Fourier analysis. In this case, Fourier components of the signals are calculated, in particular complex Fourier components, which also provide information about the phases of the components. In particular, the spectrum analyzer may be configured as an FFT or DFT unit.

In addition, or alternatively thereto, the spectrum analyzer may use, for example, a discrete Laplace transform, or some other mathematical operation (e.g., a wavelet transform) may be used that produces spectrum-dependent components.

The parameters generated by the spectrum analyzer 30, which describe spectral characteristics of the vibration of the support plate, are analyzed in a suitable manner. For example, one or more peaks of the spectrum can be detected to determine the resonance frequencies and evaluated in the manner mentioned above.

In another advantageous embodiment, the data generated by the spectrum analyzer 30 is fed to a deep neural network 32, preferably with a depth greater than 2. This network 32 has one, two, or more outputs corresponding to parameters to be determined by the weighing device, e.g. the weight g and the diameter d of an object.

The neural network 32 is preferably a "feed forward" neural network.

The network 32 is trained by means of calibration measurements in which the parameters of the load are varied (e.g., the diameter and position of an object on the support plate). For each such parameter set, the signals of the measuring element 14 are recorded and the input values of the neural network 32 are calculated from them using the spectral analyzer 30.

Instead of calibration measurements, numerical simulations can also be used for training, in which case the parameters of the load are, again, varied, but from which the input parameters of the network (e.g. the Fourier components) are then determined numerically, e.g. by means of "finite element simulation".

More generally, the controller 16 of the weighing device advantageously comprises a neural network 32 to which the spectral characteristics determined with the measuring element, in particular a Fourier spectrum of the signal of the measuring element 14, are fed, and which is trained to determine therefrom the mass of the object on the support plate and, if necessary, further parameters of this object.

Such an arrangement is capable of processing a large number of spectral features and of obtaining more accurate results therefrom.

The spectrum analyzer can also be used to determine multiple spectra as part of one measurement run. This is particularly useful when a frequency sweep is performed by means of the excitation element 12, either continuously or in steps. In this case, the spectra of the oscillation can be acquired for individual excitation frequencies or spectra. These can then be combined, for example, using a "peak hold" algorithm. Individual spectra can be ignored or weighted differently. The individual spectra can also be evaluated directly, e.g. with the means mentioned above.

Haptic or Acoustic Feedback

The excitation element 12, which generates mechanical vibrations in the support plate 1, can be used not only for the weighing process, but also for other applications.

In particular, the controller 16 may be adapted to use the excitation element 12 as an output means for communicating with a user, particularly to communicate a state of the device or to respond to a user action.

For this purpose, the controller can in particular use at least one of the following communication types:

- The controller 16 can control the excitation element 12 to generate haptic feedback for the user, for example when the user touches the support plate 1. This is particularly advantageous if a control panel 18 is arranged on the support plate (cf. FIG. 2), for example in the form of one or more touch-sensitive areas. In order to generate a haptic feedback, the excitation element 12 is advantageously controlled to generate a short mechanical pulse of, for example, between 0.05 and 1 second.
- The controller 16 can control the excitation element 12 to generate acoustic feedback for the user. For this purpose, the excitation element 12 is excited to generate an audible vibration, in particular in the frequency range between 100 and 10,000 Hz.

Accordingly, the controller is advantageously adapted to use the excitation element 12 as an output means for communicating with a user. In particular, the controller 16 can be adapted to generate an acoustic or a haptic feedback in the support plate 1.

Within the scope of the present method of operation, a step is thus advantageously provided in which the excitation element is used for communication with the user. In particular, a haptic and/or an acoustic signal can be generated for this purpose by means of the excitation element 12 in the support plate 1.

Arrangement of the Excitation and Measuring Element

The excitation element 12 and the measuring element 14 can be attached to the support plate 1 from below. This protects them from damage from above.

Figure 12:
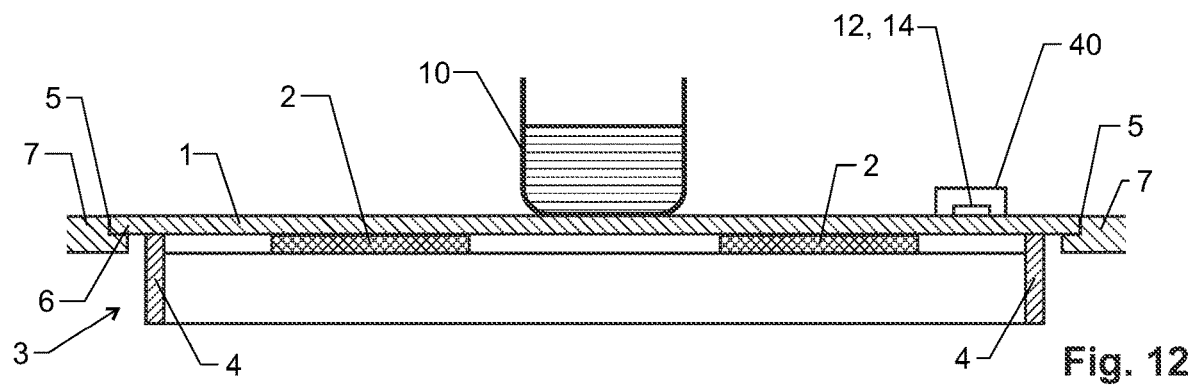
FIG. 12 is an embodiment in which the excitation and measuring elements are arranged from above on the support plate and are integrated in a measuring device.

FIG. 12 shows an embodiment in which excitation and measurement members 12, 14 are arranged, for example, as at least one measuring device 40 from above on the support plate 1.

In the embodiment shown, the excitation and measurement members 12, 14 are configured as a measurement device 40 and are shown as a single component by way of example, and they are integrated into a common measuring device. However, they may also be designed as two separate components, in which case they may be arranged in one or more measuring devices.

This arrangement of excitation member 12 and measuring element 14 also allows, for example, a post-fitting or temporary positioning of the present measuring device with/on the support plate 1.

In particular, the measuring device 40 can be designed as a unit separate from the support plate 1, which can be placed on the support plate 1, e.g. when needed. In particular, the measuring device 40 may be, for example, a smartphone programmed by means of an application to perform the method described herein. In this case, for example, the loudspeaker and/or vibration generator of the smartphone can be used as the excitation element 12, while the microphone and/or the acceleration sensor serve as the measurement member 14. It is also possible to provide a separate excitation and/or measurement member 12, 14 for wireless or wired connection to a smartphone or tablet.

Notes

Advantageously, the excitation is not carried out at all frequencies, but only at those frequencies at which interesting, evaluable resonances are expected. Thus, for example, individual modes can be excited in a targeted manner.

In the above embodiments, a cooktop with four heating elements 2 is shown. However, the number of heating elements can vary. In particular, a freely configurable two-dimensional array of heating elements can also be provided, in which shaped heating zones can be activated depending on the cooking load. Corresponding devices are known to the skilled person.

Advantageously, the support plate 1 has a rectangular shape. However, a round, elliptical or polygonal shape is also possible.

Figure 9:
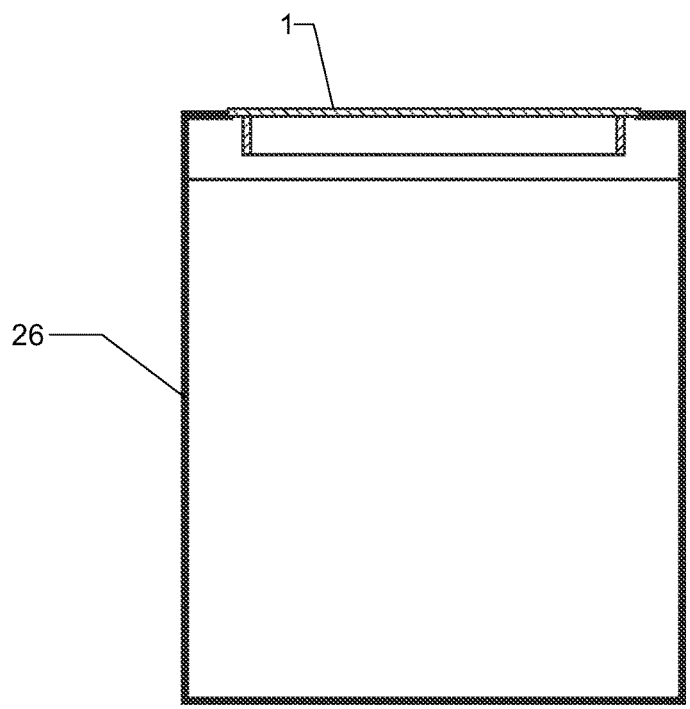

The weighing device is advantageously integrated in a cooktop for cooking, as described above. However, it can also be arranged in any furniture 26, e.g. on its upper side as a worktop, as illustrated in FIG. 9. Advantageously, the furniture 26 is a kitchen furniture.

The support plate 1 is advantageously made of glass ceramic because this material is robust and/or can also withstand high temperatures.

Preferably, the support plate has an extension of at least 30 cm in each horizontal direction. This results in greater independence from the respective diameter and position of usual cooking vessels.

To perform calibration measurements and/or to train the aforementioned neural network, a ring with a known diameter can optionally be arranged between support plate 1 and the respective reference object. This allows a defined support size to be achieved.

When analyzing the signal from the measuring element 14, certain frequency ranges can optionally be masked out, e.g. if it becomes apparent during calibration that these frequency ranges are primarily dominated by the arrangement of the support plate 1 in the surrounding furniture.

For evaluation, a convolution between the signal of the excitation element 12 and the signal of the measurement member 14 can also be calculated, e.g. by multiplication in Fourier space. This allows, for example, to mask harmonics or signals from other sources.

Further, the evaluation can also be performed with a lock-in amplifier, which filters the signal of the measuring element 14 with the signal of the excitation element and provides the phase and amplitude at the frequency of the excitation signal.

To calibrate the device, a standard weight of known size can e.g. also be provided, which the user or installer places at one or more points on the support plate 1, whereupon the device controller performs test measurements.

While preferred embodiments of the invention are described in the present application, it should be clearly noted that the invention is not limited to these and may be carried out in other ways as well within the scope of the following claims.

What is claimed is:

1. A weighing device for weighing an object comprising:
a support plate for receiving the object,
a controller,
at least one excitation element for generating mechanical vibrations in the support plate, and
at least one measuring element for measuring the mechanical vibrations, wherein the weighing device is adapted to
using the excitation element and the measurement element to determine at least one spectral characteristic of the vibrations, and
using the spectral characteristic to determine a mass of the object,
wherein the controller is adapted to
determining at least two different spectral characteristics of the oscillations,
using the at least two spectral characteristics to determine the mass of the object,
determining the resonance frequencies of at least two eigenmodes of the support plate, and
using the resonant frequencies of the at least two eigenmodes to determine the mass of the object.

2. The weighing device of claim 1, wherein the measured resonant frequencies are the lowest resonant frequencies of the support plate.

3. A weighing device for weighing an object comprising:
a support plate for receiving the object,
a controller,
at least one excitation element for generating mechanical vibrations in the support plate, and
at least one measuring element for measuring the mechanical vibrations, wherein the weighing device is adapted to
using the excitation element and the measurement element to determine at least one spectral characteristic of the vibrations, and using the spectral characteristic to determine a mass of the object,
wherein the controller is adapted to
determining at least two different spectral characteristics of the oscillations,
using the at least two spectral characteristics to determine the mass of the object, and
use at least two spectral characteristics to determine or eliminate at least one further unknown parameter of the object.

4. The weighing device of claim 3, wherein the spectral characteristic comprises at least one resonant frequency of the support plate.

5. The weighing device of claim 3,
wherein the support plate is rectangular or square and wherein at least one of the excitation element and the measuring element is arranged, within a tolerance T, on at least one diagonal of the support plate, wherein the tolerance T is at most 10% of a shorter side length of the support plate, and
wherein at least one of
a distance D1 of the excitation element from a center of the diagonal and
a distance D2 of the measuring element from the center of the diagonal
lies in a range between 5% and 45% of the length L of the diagonal.

6. The weighing device of claim 3, wherein it comprises a plurality of measuring elements at different positions.

7. The weighing device of claim 3, having a device frame that is affixed to a bottom of the support plate and spaced from all sides from an outer edge of the support plate.

8. The weighing device of claim 3, wherein a controller of the weighing device is adapted to determine at least one calibration parameter under a known load.

9. The weighing device of claim 3, wherein a controller of the weighing device is adapted to perform gross and tare measurements on the same container.

10. The weighing device of claim 3, comprising a positioning aid for positioning the object on the support plate.

11. The weighing device of claim 10, wherein the positioning aid forms a raised area on the support plate.

12. The weighing device of claim 3, wherein the controller is adapted to use the excitation element as an output means for communicating with a user.

13. A cooktop comprising a weighing device of claim 3, wherein the cooktop comprises a plurality of heating elements arranged beneath the support plate such that the support plate forms a cooking surface of the cooktop.

14. A piece of furniture with a weighing device of claim 3.

15. The weighing device of claim 3, wherein the at least one further unknown parameter of the object comprises at least one of the diameter and/or at least one location parameter of the object on the support plate.

16. A method of operating the weighing device of claim 3 for weighing an object, wherein the method comprises at least the following steps:
generating mechanical vibrations in the support plate by means of the excitation element,
measuring at least one spectral characteristic of the vibrations with the measuring element, and
using the at least one spectral characteristic of the vibrations to determine a mass of an object on the support plate.

17. The method of claim 16, further comprising the step of:
using the excitation element for communication with the user.

18. The method of claim 17, wherein at least one of a haptic and an acoustic signal is generated in the support plate by means of the excitation element in order to communicate with the user.

19. A weighing device for weighing an object comprising:
a support plate for receiving the object,
a controller,
at least one excitation element for generating mechanical vibrations in the support plate, and
at least one measuring element for measuring the mechanical vibrations, wherein the weighing device is adapted to
using the excitation element and the measurement element to determine at least one spectral characteristic of the vibrations, and
using the spectral characteristic to determine a mass of the object,
wherein the support plate has a stiffened region, wherein a stiffness of the support plate inside the stiffened region is greater than outside.

20. The weighing device of claim 19, wherein the support plate is of glass ceramics.

21. The weighing device of claim 19, wherein the support plate has a thinned area extending around a target support area for the article.

22. A weighing device for weighing an object comprising:
a support plate for receiving the object,
a controller,
at least one excitation element for generating mechanical vibrations in the support plate, and
at least one measuring element for measuring the mechanical vibrations, wherein the weighing device is adapted to
using the excitation element and the measurement element to determine at least one spectral characteristic of the vibrations, and
using the spectral characteristic to determine a mass of the object,
wherein the controller comprises a neural network to which spectral characteristics are fed, and which has been trained to determine therefrom at least the mass of the object on the support plate.

23. A weighing device for weighing an object comprising:
a support plate for receiving the object,
a controller,
at least one excitation element for generating mechanical vibrations in the support plate, and
at least one measuring element for measuring the mechanical vibrations, wherein the weighing device is adapted to
using the excitation element and the measurement element to determine at least one spectral characteristic of the vibrations, and
using the spectral characteristic to determine a mass of the object,
wherein the support plate is rectangular or square and wherein at least one of the excitation element and the measuring element is arranged, within a tolerance T, on at least one diagonal of the support plate, wherein the tolerance T is at most 10% of a shorter side length of the support plate, and wherein at least one of
a distance D1 of the excitation element from a center of the diagonal and
a distance D2 of the measuring element from the center of the diagonal lies in a range between 5% and 45% of the length L of the diagonal, and
wherein the excitation element and the measuring element are arranged on different diagonals and wherein a control panel is arranged between the excitation element and the measuring element beneath the support plate.

24. A weighing device for weighing an object comprising:
a support plate for receiving the object,
a controller,
at least one excitation element for generating mechanical vibrations in the support plate, and
at least one measuring element for measuring the mechanical vibrations, wherein the weighing device is adapted to
using the excitation element and the measurement element to determine at least one spectral characteristic of the vibrations, and
using the spectral characteristic to determine a mass of the object,
wherein the weighing device further comprises a plurality of measuring elements at different positions, and
wherein the controller is adapted to determine an amplitude ratio and/or a phase shift between signals of the measuring elements at the resonant frequency.

25. The weighing device of claim 24, wherein the controller is adapted to determining at least two different spectral characteristics of the oscillations and using the at least two spectral characteristics to determine the mass of the object.

26. The weighing device of claim 24, wherein the weighing device is adapted to determine spectral characteristics of a given set of modes, and wherein at least one of the excitation element and the measurement member is arranged at a location of the support plate where the oscillation amplitudes of all of the modes of the set of modes is at least 25% of a maximum oscillation amplitude of the respective mode.

* * * * *